April 30, 1929.  J. BINDON  1,710,807
AUTOMOBILE ACCESSORY
Filed Feb. 10, 1927   2 Sheets-Sheet 1
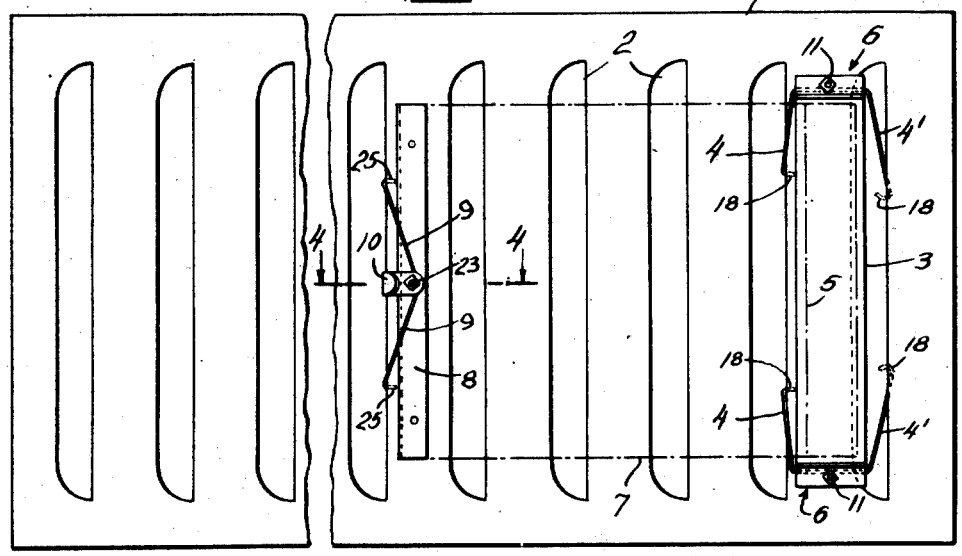
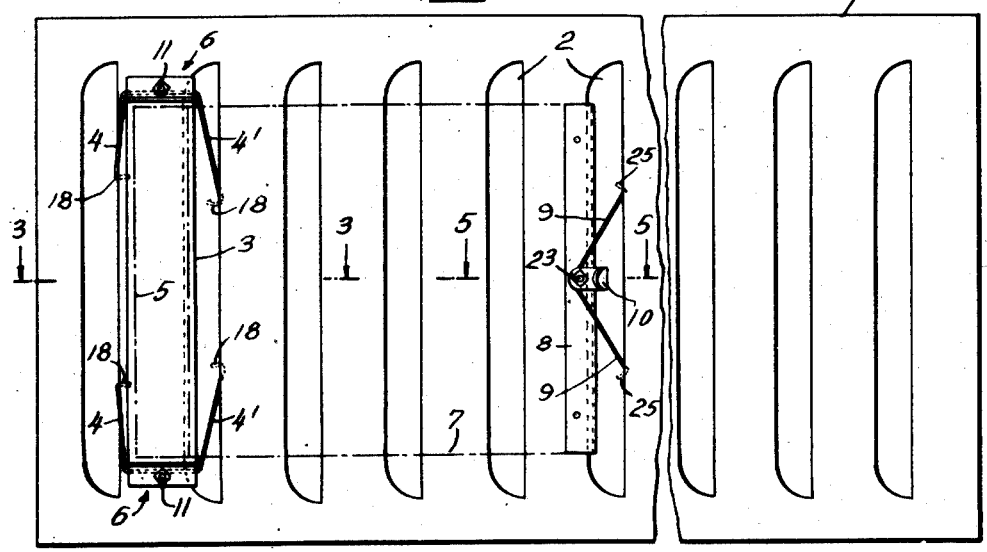
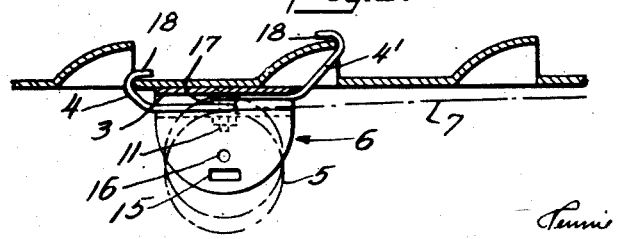
INVENTOR
James Bindon
BY
ATTORNEYS

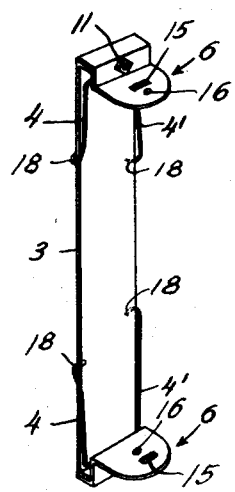
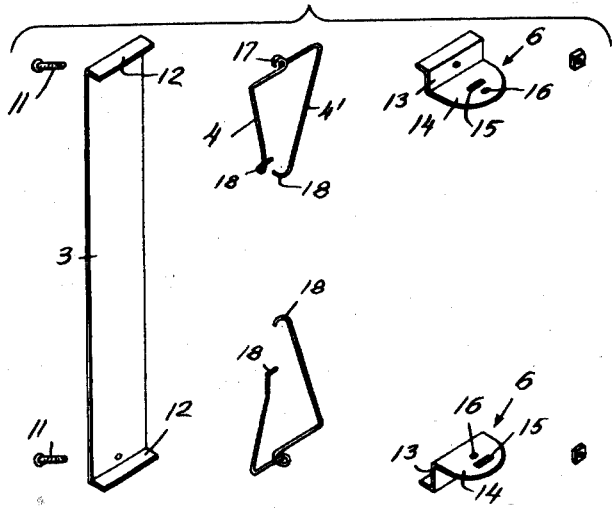
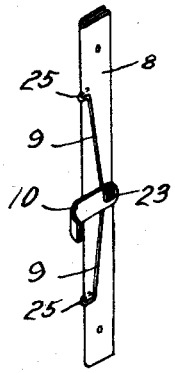
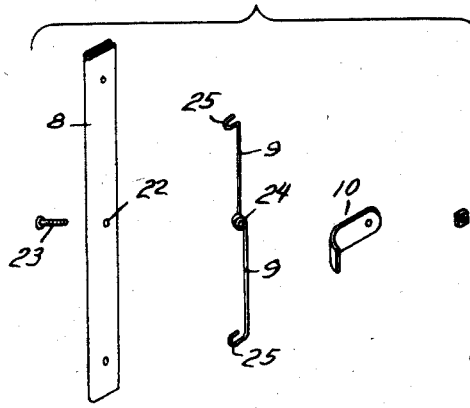
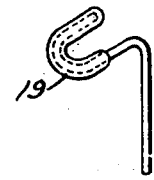
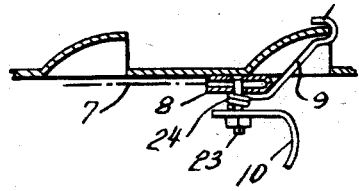
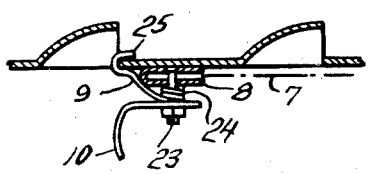

Patented Apr. 30, 1929.

1,710,807

UNITED STATES PATENT OFFICE.

JAMES BINDON, OF NEWPORT, RHODE ISLAND.

AUTOMOBILE ACCESSORY.

Application filed February 10, 1927. Serial No. 167,094.

This invention relates to automobile hood curtains. More particularly, it relates to the type of hood curtain for regulating the degree of ventilation and passage of air through the side vents or louvres of automobile hoods, disclosed in my co-pending application Serial No. 90,237, filed February 24, 1926.

In automobiles employing water cooled engines a considerable inrush of air through the radiator is necessary to keep the temperatures of the motor below certain operating limits. The steady stream of inflowing air is produced in part by the forward movement of the vehicle and in part by a suction fan usually placed directly in back of the radiator.

Such air must find an outlet after being drawn through the radiator and over the engine surfaces. For that reason vents or louvres are placed in the side walls of the hood. The cold air, drawn in through the radiator, is warmed in passing through, further heated in passing over the hot engine surfaces, and drawn off partly through the louvres and partly through the opening at the rear end of the engine crank case. In warm weather it is decidedly advantageous to remove the heated air as quickly as possible from the vicinity of the engine. In cold weather, however, the exact opposite is true. When the automobile is operated, air must still be drawn in through the radiator to cool the circulating water, but the engine must not be cooled down too far by the removal of its radiated heat. It is therefore advisable to adopt some means whereby some of the radiated engine heat will be retained within the hood and not drawn off by the current of air. In addition, any means for retaining the engine heat within the hood when the car is stopped in cold weather is a decided advantage. Cross drafts through the hood vents carry away the radiated heat of the motor. Snow or rain driven into the hood through the rearwardly open vents chills the motor and sometimes damages the engine.

I have, therefore, constructed a type of vent regulator which is well adapted for the purposes above mentioned and yet is extremely simple in both operation and construction. Since the fewer the obstructions to air passage in warm weather the better, I have made my device detachable; and in making it detachable I have used several features not found in any other type of vent regulator. For cold weather driving it is easily applied; for warm weather driving it is just as easily removed; and for driving in any weather at all, it provides a definite and variable adjustment of the degree of air passage through the hood vents.

In general, my type of regulator is constructed in the form of a rolled curtain extensible over all the louvres or any desired number of them. Such portion of the curtain as is not actively used to cover the vents desired is compactly rolled upon a spring roller at one end of the hood. The entire device including roller, fasteners and curtain is enclosed within the hood and so attached to the side sections thereof that it does not interfere with their opening and closing. Each side section carries the unit mounted on its inner wall independent of the rest of the hood and unnoticeable from the outside.

In order that either the front or rear louvres may be left uncovered to provide the escape of some of the air either before it has passed over the engine or afterward, I have so constructed my hood curtain that the roller support may be attached either at the front or the rear end of the hood section and the curtain unrolled to cover either the rear or the front louvres, as desired. In addition, I have devised a hood curtain adaptable to louvres of different lengths so that my device may be applicable to the hood sections of all types of automobiles.

For a better understanding of the invention reference is made to the accompanying drawings wherein:

Fig. 1 is a side elevation of a hood section showing my roller support secured to the rear end thereof.

Fig. 2 is a side elevation of a hood section showing my roller support secured to the front end thereof.

Fig. 3 is a sectional view on the line 3—3 of Fig. 2.

Fig. 4 is a sectional view on the line 4—4 of Fig. 1.

Fig. 5 is a sectional view on the line 5—5 of Fig. 2.

Fig. 6 is a perspective view of my roller support.

Fig. 7 is a perspective view of the several parts comprising the assembly of my roller support.

Fig. 8 is a perspective view of my curtain end plate.

Fig. 9 is a perspective view of the several parts comprising the assembly of the curtain end plate.

Fig. 10 illustrates the use of rubber tips with the spring ears.

Considering my invention more in detail in connection with the accompanying drawings which illustrate one embodiment of my invention, a representative type of hood section is shown at 1 in Fig. 1. The vents or louvres in the hood section are shown at 2. The bracket support carrying the roller is indicated at 3 attached to the rearward end of the hood section by spring arms 4 and 4'. The roller 5, which may be a spring roller of the common form, is mounted between the shoulders 6 of the support 3 and carries the extensible curtain 7. At its free end the curtain is secured to an end plate 8 provided with spring arms 9 for attaching it to the hood section, and with a bent ear 10 to be used as a finger grip. The manner in which the hood curtain is operated when the roller support is secured to the front of the hood section is illustrated in Fig. 2. The uncovered louvres may therefore be located either at the front of the hood section, as in Fig. 1 or at the rear, as in Fig. 2. By regulating the extension of the curtain 7 the air passing in through the radiator may be allowed to escape either before or after it has passed over the engine, depending upon whether the front louvres or the rear louvres are left uncovered.

The top views of Figs. 3, 4 and 5 show more clearly the manner in which the springs 4 and 4' and 9 secure the roller support and curtain plate to the hood section without producing unsightly outward evidences of the use of the device. The short spring arms 4 are hooked around the leading edge of the louvres and the longer arms 4' are hooked around the outwardly flaring trailing ends of the louvres to securely hold the roller bracket 3 against the inner side of the hood section. If desired, rubber tips may be placed over the ends of the spring arms to eliminate any possibility of the bent ears of the arms marring the finish of the hood. The curtain plate is held against the hood section by the hooking of the spring arms 9 behind the straight forward edge of the louvres, as in Fig. 4, when the roller support is secured to the rear end of the hood section, and by the hooking of the spring arms 9 behind the flaring edge of the louvres, as in Fig. 5, when the roller support is attached to the front end of the hood section. Since the bent ears of the spring arms need be only large enough to hook securely behind the edges of the louvres, no noticeable outward evidences of the device are present to detract from the appearance of the automobile hood. Furthermore, since the device is attached to the hood section without the use of bolts or screws or rivets, the finish of the hood is not marred or injured in any way.

The spring roller 5 is mounted between the shoulders 6 of the roller bracket 3 with the customary free pivot and fixed pivot. The roller is not ratcheted, the curtain is therefore always under the tension produced by the twisting of the coil spring within the roller. As a result, the curtain is always taut regardless of how far it is extended, and the rolling up of the curtain is accomplished without the inconvenience of first disengaging the ratchet dogs.

The shoulders 6 are formed separate from the support 3 and are of standard size. The bracket 3, on the other hand, is made in different lengths depending upon the length of the louvres to be covered. The bracket may be made up in different lengths to fit the louvres of different makes of automobiles and the shoulders attached by means of suitable means such as the bolts 11. An upturned portion 12 is provided at either end of the bracket plate 3 to stiffen the plate and also to act as a bearing shoulder for the correspondingly bent portion 13 of the shoulders 6. Ears 14 are provided on the shoulders 13 to furnish end supports for the roller pivots. These ears may be of any suitable shape although I prefer to make them of substantially semi-circular form. In each ear is arranged a rectangular opening 15 for the fixed pivot of the roller and a circular opening 16 for the free pivot. The purpose of this will be explained later.

The roller bracket and shoulders may be made up of metal having any suitable thickness. Because no excessive strain is placed upon the shoulders and since the bracket plate is held flat against the inside of the hood section, metal of a relatively thin section may be employed. Since the insertion of the roller between the shoulders 6 is accomplished by pushing them slightly apart, it is desirable to use material that permits of such an action without necessitating too great a pressure.

Since the curtain roller is non-ratcheting, the curtain will always be drawn tight. This is of considerable advantage because the constant rush of air through the hood has a tendency to produce a fluttering of the curtain if it is the least bit loose. A very strong spring in the roller is therefore to be desired. To overcome fire hazard and the dangers incident to the curtain becoming oily or greasy, the fabric is treated to render it fire proof. As a safeguard against deterioration and rotting, due to the curtain being rolled up while wet, the material is waterproofed. Rain or snow and such grease as may accumulate on the curtain during use therefore leads to no ill effects and does not harm the durability of the fabric. The curtain may also be removed from the hood section and thoroughly cleaned, when necessary, without injuring the material.

The springs, illustrated in Fig. 7 attached to either end of the roller bracket, Fig. 6, are provided with a short arm 4 and a long arm 4'. The springs may be made up of suitable spring wire coiled to form a loop 17 and possessing considerable stiffness. The ends of the arms are bent as shown to form ears 18 of sufficient size to hook around the edges of the louvres. If desired, rubber tips 19 may be arranged on the ears 18 as in Fig. 10 to protect the exterior finish of the hood section at the point of contact.

The assembling of the roller support is performed as shown in Fig. 7. The loop of each spring is inserted between the parallel flat portions of the shoulders 6 and bracket plate 3 and a bolt passed through the opening 20 in the plate 3, through the loop 17 of the spring and through the hole 21 in the shoulder 6. A suitable detachable means such as an ordinary nut or a wing nut is then threaded on the bolt and the parts securely clamped together. The ears 18 of the spring arms are then hooked around their corresponding edge of the plate, so as to be in a convenient position for ready attachment to a hood section.

When it is desired to secure the bracket to a hood section, the short spring arms 4 are hooked behind the leading edge of the louvres and the long arms 4' are hooked behind the flaring edge of the louvres. The springs are provided with one long arm for the express purpose of permitting it to be bent outwardly far enough to hook behind the flaring edge. The transference of the bracket from one end of the hood section to the other is accomplished merely by disengaging the spring arms and moving the bracket to its new position where it is again attached as before. Because of the substantially triangular shape of the springs, which places the arms under tension even when hooked around the edge of the bracket before attachment to a hood section, a considerable tension is established when the arms are forced still further apart to secure the bracket in place. The bracket will therefore be held securely in place and will not rattle or shake loose. The spring arms provide a simple yet very efficient means of attachment and can be manufactured at very low cost.

The curtain plate 8 is shown complete in Fig. 8 and the manner in which the assembly is made is shown in Fig. 9. The plate 8 may be of channel section, in the groove of which the fabric of the curtain is clamped by means of rivets or other fastening means. At its center, the plate is provided with a hole 22 through which a rivet or bolt 23 is passed to secure the loop 24 of the spring 9 and the bent ear 10 in place. The loop 24 may be disposed either between the plate 8 and the ear 10 or on top of the ear 10. The particular location is not of material importance.

The spring 9 may be made of the same material as the springs 4 and 4' and is provided with two spring arms having bent ears 25 at their extremities. The loop 24 is secured at some distance back from the leading edge of the plate 8 in order to produce a tension in the spring arms when the ears 25 are hooked behind the edge of the plate. The length of the spring arms may vary according to the length of the end plate. Ordinarily, it will be found that arms of substantially one third the length of the plate produce sufficient tension to hold the plate in position and yet are not too stiff to prevent easy manipulation.

By providing a fixed pivot opening 15 and a free pivot opening 16 in the bearing ear 14 of each shoulder 6, the curtain roller can be readily reversed to permit unrolling in the right direction irrespective of whether the bracket 3 is located at the front or the rear of the hood section. Thus, when the bracket 3 is located at the rear of the hood section, as in Fig. 1, the curtain is unrolled to the left. When the bracket is moved to the front, as in Fig. 2, the curtain is unrolled to the right. Since the shoulders 6 are each provided with the fixed and free pivot openings it is only necessary to take out the roller, turn it end for end and reinsert it. While one set of corresponding pivots is thus located at a greater distance from the base of the bracket 3, the difference is not sufficient to be of any importance. The roller in one position is of course further away from the hood section but when it is considered that the distance between the two pivot openings in each ear does not amount to much more than one eighth or one quarter of an inch, it is readily evident that no undesirable results are present.

Furthermore, instead of providing the ears of the shoulders 6 with double pivot openings, to permit the reversing of the roller when the bracket is moved from one end to the other of the hood section, I can accomplish the same result by interchanging the roller support springs end for end. That is, with the bracket located as in Fig. 1 the short arms 4 engage the straight edge of the louvre and the long arms 4' engage the flaring edges. If now the support is to be located as shown in Fig. 2, the entire bracket is turned end for end in order to permit the curtain to be unrolled to the right instead of to the left as it was before. However, with the bracket in the turned position, the short arms 4 of the springs will be on the flaring edge side of the louvres and the long arms 4' will be on the straight edge side. Considerable difficulty would be encountered in attempting to press the short arms outward to engage the flaring edge because they would be too short and too stiff. It is therefore advisable to remove the nut, interchange the springs and clamp the bracket together. The short arms 4 are then on the straight edge side as shown in Fig. 2 and the long arms 4' are on the flaring edge side. In this position the arms can be readily attached to the louvre edges in the same manner as they were before.

Because of the demountability and detachability of my curtain device, it is possible to remove all of the parts except the roller bracket, which may be left attached to the hood in a position where it is readily available for use yet out of the way when not desired. The bracket may thus be left attached to the hood section during warm weather and the curtain applied when it is desired to close some of the vents during cold weather. Or the entire device including the bracket may be detached from the hood section and stored away for later use. In either the rear mounting of Fig. 1 or the front mounting of Fig. 2, the curtain may be used to cover some of the vents and leave the remainder open, and the location of the open louvres may be readily changed merely by relocating the bracket. With my device it is therefore possible to arrange the bracket upon the hood section in such a position that any given louvres may be left uncovered while the remainder are covered. The ventilation of the motor may accordingly be accomplished with accuracy and with ease for any degree of adjustment.

I claim:

1. In a device of the type described a roller support comprising a base portion having upturned end edges, and detachable shoulders extending at right angles to said base portion and spaced therefrom by said upturned edges.

2. In a device of the type described a roller support comprising a base portion having upturned end edges, detachable shoulders superposed upon said end edges and spaced from said base portion, said shoulders having a portion extending parallel and a portion extending perpendicular to said base portion, and means for detachably connecting said shoulders to said base portion.

3. In a device of the type described a roller support comprising a base portion, detachable shoulders secured to said base portion, and spring means interposed between said shoulders and said base portion for attaching said support to a hood section.

4. In a device of the type described a roller support comprising a base portion, detachable shoulders secured to said base portion, and spring means interposed between said shoulders and said base portion and extending around both side edges of said base portion for attaching said support to a hood section, said means being adapted to be bent outside of the plane of said base portion.

5. In a device of the type described a roller support comprising a base portion, detachable shoulders adapted to be secured to said base portion, tong shaped springs having a coiled portion interposed between each of said shoulders and said base portion and oppositely arranged arms extending around both side edges of said base portion, and means extending through each of said coiled portions for detachably connecting said shoulders to said base portion.

6. In a device of the type described means for attaching a roller support to a hood section comprising a pair of tong shaped springs each having a coiled portion and two convergent arms spaced apart by said coiled portion, each of said arms being adapted to extend along and around one side of said support, and detachable means extending through said coiled portion for attaching one of said springs to each end of said support.

7. In a device of the type described means for attaching a roller support to a hood section comprising a pair of substantially triangular shaped springs each having a coiled portion and two convergent arms continuous with and spaced apart by said coiled portion, one of said arms being longer than the other, each of said arms being adapted to extend along one side of said support and each having a bent end portion adapted to extend around one side of said support, and detachable means extending through said coiled portion for attaching one of said springs to each end of said support.

In testimony whereof I affix my signature.

JAMES BINDON.